United States Patent
Snider et al.

(10) Patent No.: US 10,055,212 B2
(45) Date of Patent: Aug. 21, 2018

(54) EVOLVING STREAMING INSTALLATION OF SOFTWARE APPLICATIONS

(71) Applicant: Microsoft Technology Licensing, LLC, Redmond, WA (US)

(72) Inventors: Joshua Merrill Snider, Seattle, WA (US); Gershom L. Payzer, Redmond, WA (US); Christopher Ian Pick, Redmond, WA (US); Jonathan MacNeill Ward, Kirkland, WA (US); Michael Arnquist, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/249,181

(22) Filed: Aug. 26, 2016

(65) Prior Publication Data
US 2018/0060053 A1    Mar. 1, 2018

(51) Int. Cl.
*G06F 9/445*   (2018.01)
*G06F 8/61*    (2018.01)
*H04L 29/08*   (2006.01)

(52) U.S. Cl.
CPC ............. *G06F 8/61* (2013.01); *H04L 67/06* (2013.01)

(58) Field of Classification Search
CPC ........................................................ G06F 8/61
USPC ................... 717/168–178; 709/203
See application file for complete search history.

(56) References Cited

U.S. PATENT DOCUMENTS

| | | | | |
|---|---|---|---|---|
| 5,684,996 A * | 11/1997 | Westerholm | .............. | G06F 8/61 |
| | | | | 713/100 |
| 6,097,887 A * | 8/2000 | Hardikar | .............. | G06F 17/2881 |
| | | | | 717/105 |
| 6,678,888 B1 * | 1/2004 | Sakanishi | ................. | G06F 8/61 |
| | | | | 707/999.202 |
| 6,757,887 B1 * | 6/2004 | Kaplan | ..................... | G06F 8/36 |
| | | | | 714/38.1 |
| 6,915,513 B2 * | 7/2005 | Duesterwald | ........... | G06F 8/656 |
| | | | | 717/168 |
| 7,062,567 B2 * | 6/2006 | Benitez | ..................... | G06F 8/65 |
| | | | | 709/217 |
| 7,127,713 B2 * | 10/2006 | Davis | .................. | H04L 63/0227 |
| | | | | 717/177 |
| 7,506,338 B2 * | 3/2009 | Alpern | ................ | G06F 9/44521 |
| | | | | 713/191 |

(Continued)

OTHER PUBLICATIONS

Alpern et al, "PDS: A Virtual Execution Environment for Software Deployment ", ACM, pp. 175-185, 2005.*

(Continued)

*Primary Examiner* — Anil Khatri
(74) *Attorney, Agent, or Firm* — Klarquist Sparkman, LLP

(57) ABSTRACT

High-performance streaming installation of software applications can be achieved by pre-fetching chunks of application files. Pre-fetching can be directed by a recipe file that can handle a wide variety of application behaviors. If a missing chunk is encountered during execution of the application, a cache miss record can be created and forwarded to a telemetry server. Cache miss records can be aggregated to generate a revised recipe file so that future installations of the application avoid the missing chunk scenario. Using the revised recipe file can cause fewer interruptions, result in less delay and otherwise improve performance.

18 Claims, 10 Drawing Sheets

(56) References Cited

U.S. PATENT DOCUMENTS

| | | | | |
|---|---|---|---|---|
| 7,810,089 | B2* | 10/2010 | Sundarrajan | G06F 8/61 717/174 |
| 8,019,811 | B1* | 9/2011 | Britto | G06F 9/542 709/203 |
| 8,301,874 | B1* | 10/2012 | Heidingsfeld | G06F 17/30168 713/1 |
| 8,392,912 | B2* | 3/2013 | Davis | H04L 63/0227 717/172 |
| 8,452,567 | B1* | 5/2013 | Sullivan | G06F 11/3688 702/122 |
| 8,613,673 | B2 | 12/2013 | Perry et al. | |
| 8,805,949 | B2* | 8/2014 | Aviles | H04L 41/0893 709/203 |
| 8,943,491 | B2* | 1/2015 | Brogan | G06F 12/0897 717/170 |
| 9,043,782 | B2 | 5/2015 | Tepper et al. | |
| 9,332,087 | B2 | 5/2016 | Morrison, III et al. | |
| 2005/0282636 | A1 | 12/2005 | O'Brien | |
| 2006/0069796 | A1 | 3/2006 | Lucas et al. | |
| 2010/0016081 | A1 | 1/2010 | Prochnow | |
| 2012/0283017 | A1 | 11/2012 | Ahiska et al. | |
| 2012/0311080 | A1 | 12/2012 | Alsina et al. | |
| 2013/0318211 | A1 | 11/2013 | Kent et al. | |
| 2014/0162792 | A1 | 6/2014 | Nguyen et al. | |
| 2014/0351301 | A1 | 11/2014 | Yandek et al. | |

OTHER PUBLICATIONS

Owen et al, "Using Remote Installation Services for Windows to Streamline Installations in the UTPB Computer Science Research Lab", ACM, pp. 301-307, 2006.*

Ghosh et al, "Cache Miss Equations: An Analytical Representation of Cache Misses", ACM, pp. 317-324, 1997.*

Puzak et al, "An Analysis of the Effects of Miss Clustering on the Cost of a Cache Miss", ACM, pp. 3-12, 2007.*

Parihar et al, "A Coldness Metric for Cache Optimization", ACM, pp. 1-2, 2013.*

Windodo et al, " RDM: Rapid Deduplication for Mobile Cloud Storage", ACM, pp. 14-18, 2017.*

Belguidoum et al, "Analysis of deployment dependencies in software components", ACM, pp. 735-736, 2006.*

Aasbakken et al, "Evaluation of User Engagement and Message Comprehension in a Pervasive Software Installation" IEEE, pp. 27-30, 2012.*

"Simplifying Game Installation," Microsoft Dev Center, http://msdn.microsoft.com/en-us/library/windows/desktop/ee418797(v=vs.85).aspx, Oct. 2, 2011, 7 pages.

* cited by examiner

EVOLVING STREAMING INSTALLATION OF SOFTWARE APPLICATIONS

BACKGROUND

As software applications grow in size, accomplishing installation in a reasonable amount of time becomes more and more challenging. For example, an application may include a wide variety of content to handle a wide variety of scenarios. Conventional approaches copy such content to a local location, thereby achieving installation of the application.

Streaming installation can be accomplished by executing the application before the entire application is installed. For example, if execution is known to be completely linear and bandwidth is sufficient, pre-fetching of content can conceivably be engineered to remain ahead of content requests for the application.

However, strict linear execution cannot be expected in real-world use cases. Therefore, such an approach typically fails or suffers from poor performance. There are other ways of achieving streaming installation, but they typically require that such installation be designed into the application, adding considerable complexity to the software development process.

There is therefore room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In one embodiment, a computer-implemented method comprises, from a plurality of client devices installing an executable application available for installation and comprising a plurality of application chunks via a recipe file indicative of a nonlinear ordering of the application chunks, receiving application chunk access information, wherein the application chunk access information comprises indication of at least one application chunk requested during execution of the executable application but not resident at a reporting client device; aggregating the application chunk access information, wherein aggregating the application chunk access information comprises identifying a particular application chunk as to be pre-fetched; based on the application chunk access information from the plurality of client devices, generating a revised recipe file, wherein generating the revised recipe file comprises specifying that the particular application chunk is to be pre-fetched; and publishing the revised recipe file for consumption by future client devices installing the executable application.

In another embodiment, A computing system comprises one or more hardware processors; a plurality of application file chunks of an executable application available for installation by a plurality of requesting client devices; a recipe file comprising a nonlinear ordering of the application file chunks; an application installation service configured to receive a request for an application file chunk from a requesting client device and responsive to the request, send the application file chunk to the requesting client device; and a cache miss telemetry server configured to receive a report that an application file chunk associated with a chunk identifier resulted in a cache miss and generate a revised recipe file based on the chunk identifier of the report.

In another embodiment, one or more computer-readable media comprising computer-executable instructions that when executed cause a computing system to perform a method comprising receiving a plurality of cache miss records from a plurality of client devices installing an executable application, wherein the cache miss records indicate a local chunk request history before a cache miss responsible for a cache miss record; aggregating the plurality of cache miss records, wherein aggregating comprises identifying a troublesome application file chunk and a distinguishing common application file chunk in local chunk request histories associated with the troublesome application file chunk; generating an alternative path template comprising a chunk identifier of the distinguishing common application file chunk; generating an application file chunk path comprising a chunk identifier of the troublesome application file chunk; and incorporating the alternative path template and the application file chunk path into a revised recipe file, wherein the application file chunk path is activated for pre-fetching when a match is detected between the alternative path template and a local chunk request history.

As described herein, a variety of other features and advantages can be incorporated into the technologies as desired.

DETAILED DESCRIPTION

High-performance streaming installation of software applications can be achieved by pre-fetching chunks of application files. Pre-fetching can be directed by a recipe file that can handle a wide variety of application behaviors, including nonlinearity. If a missing chunk is encountered during execution of the application despite pre-fetching, a cache miss record can be created and forwarded to a telemetry server. Cache miss records can be aggregated across executing clients to generate a revised recipe file so that future installations of the application avoid missing the chunk. Using the revised recipe file causes fewer interruptions, less delay, and otherwise improves application performance.

Other features relating to operating system control, branch features, and cache miss context can be employed to accomplish the technologies as described herein.

Software development can benefit from the technologies because a software developer can develop applications that take advantage of streaming installation without having to incorporate complex streaming logic into the application.

Performance of streaming installation for applications can benefit because the technologies can be used to identify possible areas of improvement over time. The problem of improving the recipe file and avoiding future cache misses can be crowdsourced to current users, and future users can benefit.

Therefore, overall performance of the application can be enhanced via the technologies described herein. In addition, any of a number of other uses can be applied to the collected chunk access information.

Figure 1:
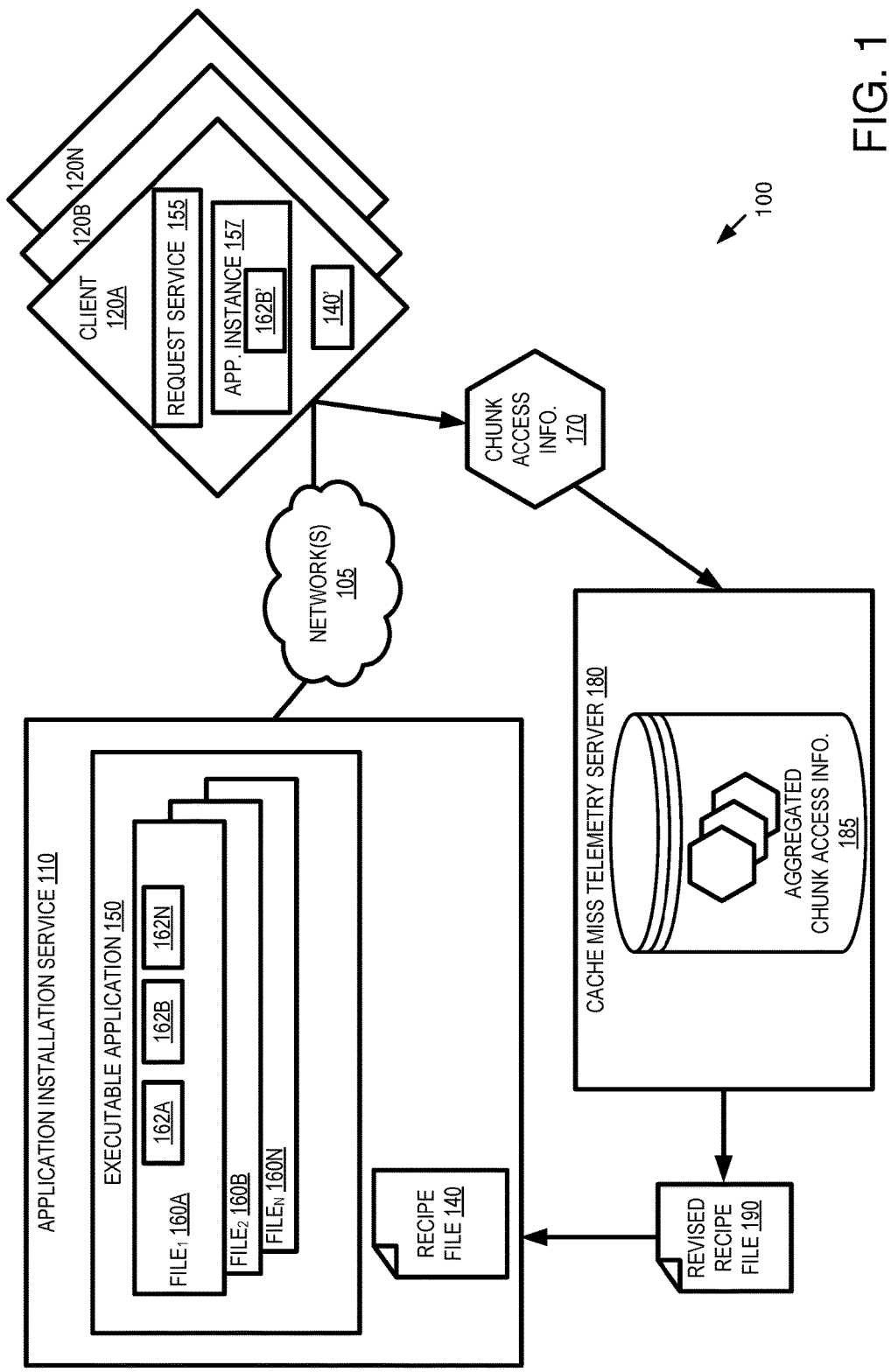
FIG. 1 is a block diagram of an example system implementing evolving streaming installation of software applications.

Example 1—Example System Implementing Evolving Streaming Installation of Software Applications FIG. 1 is a block diagram of an example system 100 implementing evolving streaming installation of software applications that can be used to realize any of the examples herein. In the example, an application installation service 110 is configured to provide application installation services to a plurality of client devices 120A-N. The service 110 can take the form of one or more computing systems as described herein.

An example executable application 150 is shown as comprising a plurality of files 160A-N, which have a plurality of application file chunks 162A-N of the executable application, which is available for installation by a plurality of requesting client devices 120A-N. In practice, such chunks are provided to requesting clients 120A-N as described herein. For example, the application service can receive a request for an application file chunk from a requesting client device and, responsive to the request, send the application file chunk to the requesting client device.

The service 110 also stores a recipe file 140 for the application 150. As described herein, such a recipe file 140 can include pre-fetching directives that evolve over time. A nonlinear ordering of the application file chunks can be included in the recipe file.

The client 120A is in communication with the application installation service 110 over the network 105. As described herein, the client 120A can comprise a request service 155 that manages requests for application chunks, including pre-fetching chunks according to the recipe file 140', which is a copy of the recipe file 140 from the service 110. A locally-executing instance 157 of the application at the client 120A can include locally available chunks (e.g., 162B', which is a copy of chunk 162B at the service 110) that have been fetched from the service 110. The local chunks can comprise fewer than the complete set of chunks for the application 150.

Information 170 about how the client 120A accesses application file chunks can be sent by the client 120A to a cache miss telemetry server 180, which can aggregate chunk access information from a plurality of the clients 120A-N and generate a revised recipe file 190 as described herein. The cache miss telemetry server can be configured to receive a report that an application file chunk associated with a chunk identifier resulted in a cache miss and generate a revised recipe file based on the chunk identifier of the report. The report can include a context in which the cache miss occurred, and the context can be integrated into the revised recipe file. In this way, streaming installation can evolve based on the information collected from the plurality of clients in a crowdsourced fashion.

The revised recipe file 190 can then replace the old file 140 and be published to clients, resulting in improved streaming installation performance for clients obtaining the revised recipe file 190.

In any of the examples herein, although some of the subsystems are shown in a single box, in practice, they can be implemented as separate cooperating subsystems. Conversely, elements can be combined. Boundaries between the components can be varied. For example, the recipe file 140 can be stored on a different device or service.

In practice, the systems shown herein, such as system 100, can vary in complexity, with additional functionality, more complex components, and the like. For example, although a single piece of chunk access information 170 is shown, in practice, a plurality of clients 120A-N can provide a plurality of pieces of information. Similarly, although only a single application is shown, in practice, a greater number of applications can be streamed for installation. Additional components can be included to implement security, redundancy, load balancing, auditing, and the like.

The described computing systems can be networked via wired or wireless network connections. Systems can be connected through a global network (e.g., Internet) or an intranet connection (e.g., in a corporate environment, government environment, educational environment, research environment, or the like).

The system 100 and any of the other systems described herein can be implemented in conjunction with any of the hardware components described herein, such as the computing systems described below (e.g., one or more hardware processors, processing units, memory, and the like). In any of the examples herein, the application file chunks, recipe files, chunk access information, and the like can be stored in one or more computer-readable storage media or computer-readable storage devices. The technologies described herein can be generic to the specifics of operating systems or hardware and can be applied in any variety of environments to take advantage of the described features.

Figure 2:
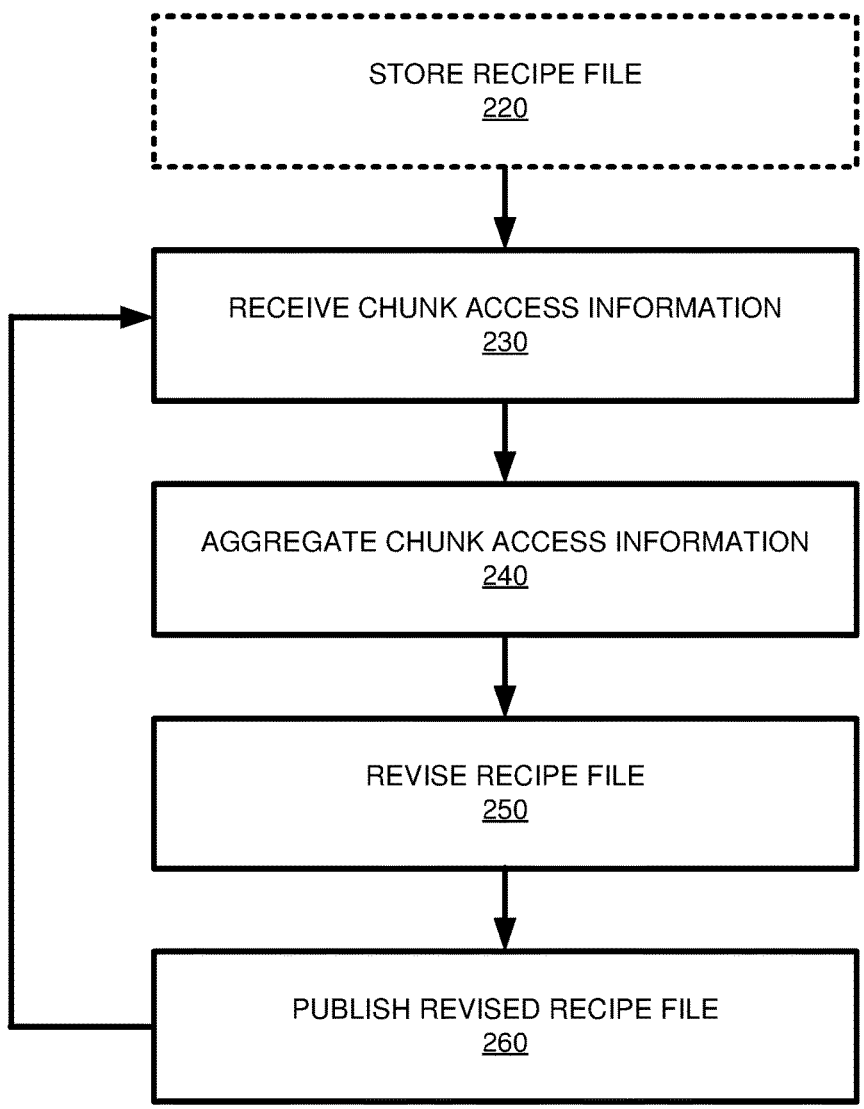
FIG. 2 is a flowchart of an example method implementing evolving streaming installation of software applications.

Example 2—Example Method of Evolving Streaming Installation of Software Applications FIG. 2 is a flowchart of an example method 200 of implementing evolving streaming installation of software applications and can be implemented, for example, in a system such as that shown in FIG. 1. As described herein, a plurality of applications and a plurality of installing clients (e.g., that are executing an application that is the subject of streaming installation) can be supported.

In practice, actions can be taken before the method begins, such as deploying the application for installation, registering users, and the like.

For purposes of context, the method shows at 220, a recipe file is stored for an executable application comprising a plurality of application file chunks of an executable application available for installation. As described herein, the recipe file can include chunk pre-fetching directives. The recipe file can indicate a nonlinear ordering of application file chunks as described herein. An initial recipe file can be created based on estimates of what application file chunks are likely to be requested as the application executes. In practice, the recipe file can also indicate an initial set of chunks to be loaded before execution begins.

At 230, chunk access information from a plurality of clients installing the executable application is received. As described herein, such information can include information about cache misses (e.g., at least one application file chunk requested during execution of the application but not resident at a reporting client device).

At 240, the chunk access information from the plurality of clients is aggregated. Aggregation can comprise identifying a particular application chunk or chunk sequence to be pre-fetched (e.g., based on a detected condition or elapsed time).

At 250, the recipe file is revised based on the aggregated application chunk access information. Such revising can comprise specifying that the particular application chunk is to be pre-fetched. For example, the application chunk can be moved within the recipe file, incorporated into a path or branch, or the like.

At 260, the revised recipe file is published. For example, the recipe file can be provided to future installing clients, and current clients can have their recipe files updated.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

In any of the technologies described herein, the illustrated actions can be described from alternative perspectives while still implementing the technologies. For example, "receive chunk access information" 230 can also be described as "send chunk access information" from a client perspective.

Example 3—Example Application File Chunks

In any of the examples herein, an application file chunk can take the form of a portion of a file accessed during execution of an application. Also, some chunks can be accessed before execution (e.g., as part of setting the application up for application or even before installation as described herein). In practice, an application file is divided into contiguous blocks, which can be of equal size.

Such files can include executable files and data files such as texture maps, images, sounds, media content, or any of a variety of other content.

In practice, an application file chunk is identified by a chunk identifier, which can include a reference to the file (e.g., maps:143 for chunk 143 of the maps file).

In any of the examples herein using a chunk, a chunk sequence can also be used. A chunk identifier can thus take the form of a chunk sequence identifier that identifies the sequence (e.g., number of chunks following a starting chunk, a range of chunks, or the like).

Example 4—Example Recipe File

In any of the examples herein, a variety of recipe file implementations can be used. In practice, the recipe file comprises a nonlinear ordering of application file chunks (e.g., represented by chunk identifiers). Nonlinear ordering can take the form of a first application file chunk appearing at a later location in the recipe file than a second application chunk, even though the second application chunk appears before the first in a particular file, or the second application chunk is from a different file from the first. The recipe file can thus support cross-file application chunk nonlinearity.

A recipe file can thus contain directives that indicate which chunks are to be pre-fetched. Additional features such as templates, paths, and branches can be incorporated into a recipe file as described herein.

The recipe file thus allows an application developer to develop an application as would normally be done (e.g., with different files), but the technologies herein can account for the fact that certain chunks in certain files are requested before those in other files.

If desired, the recipe file can include an indication of the minimum set of application file chunks required before the application executes. Such application file chunks can be pre-fetched before execution of the application is initiated.

Example 5—Example Chunk Access Information

In any of the examples herein, a variety of chunk access information can be incorporated into the technologies. Such information can be reported from clients to a telemetry server for use in generating a revised recipe file. A recurring example described herein is cache miss information. A cache miss record can include an application chunk identifier identifying the particular chunk that caused the cache miss and context under which the cache miss occurred (e.g., a cache miss context). A cache miss occurs when an application chunk is requested during execution of the application but not resident at the local client device (e.g., the client reporting the cache miss). Such cache miss context can be incorporated into a revised recipe file as described herein (e.g., to avoid the miss in the future).

Other examples, including chunk access histories (e.g., even when cache misses do not occur) can be incorporated into the technologies as described herein.

Example 6—Example Cache Miss Context Information

In any of the examples, a cache miss record can be generated that indicates an application file chunk and a cache miss context. Such context can include the circumstances under which the cache miss occurred. A version of the recipe file and chunk identifier can also be included.

Cache miss context can include an elapsed time parameter indicating elapsed time (e.g., since execution of the application began). Such time can be measured in actual time, application execution time, clock ticks, estimates thereof, or the like.

Context can also include a chunk request history as showing actual chunks requested by the application as described herein. Such information can be integrated into a recipe file by being included in a path template as described herein.

Example 7—Example Revised Recipe File

In any of the examples herein, a revised recipe file can be generated based on aggregated chunk access information. As time progresses, the revised recipe file can improve to better account for actual observed streaming installation behavior. Also, behavior can change over time, so the revised recipe file can account for such changes in behavior. The revised recipe file can be based on the original recipe file or be constructed anew. The recipe can be associated with, store or otherwise indicate a version to implement version control.

Example 8—Example Incorporation into Operating System

In any of the examples herein, the technologies can be incorporated into an operating system (e.g., as a file driver and supporting services). Thus, the client device can include a file service configured to receive requests for access to a file, which are interpreted as requests for a file chunk of the executable application. The file service can perform the chunk handling technologies described herein, including prefetching, and determining whether the chunk is locally resident (e.g., and requesting the file chunk from a remote location when not locally resident).

The file driver or other file service can be implemented so that streaming installation is transparent to the executing application (e.g., the application simply accesses files as it normally would without concern for existence of the chunking mechanism).

In some cases, communication between the file service and the application can be implemented. For example, the file service can be configured to communicate a delay condition to the executable application when a delay condition is expected (e.g., when a chunk is missing). The application can then take appropriate steps to avoid needing the chunk, such as intentionally causing additional delay, greying out options that are unavailable due to the missing chunk, or the like. Similarly, a completion condition can also be communicated (e.g., the content associated with a named label is now available locally). In this way, the application can be informed of activity underlying the technologies if desired.

The operating system can also employ an operating system affordance that accommodates delay in response to determining that a chunk is not locally resident. For example, a progress bar can be shown, an operating system controlled user interface (e.g., splash screen, cut screen, or the like) can be prolonged, or the like.

When the technologies are incorporated into the operating system, other allowances can be made for delays regarding obtaining missing chunks. For example, the operating system can suspend execution of an application until the chunks are available. The application can then be resumed while avoiding a crash due to network timeout or the like.

Example 9—Example Driver Implementations

In any of the examples herein, a file system driver can implement file access functionality (e.g., open a file, read from a file, seek within a file, or the like) for a client. Responsive to requests for such functionality, the file system driver can manage the request details with regard to the application file chunks, whether resident or missing. Chunking functionality can thus be implemented transparently to applications accessing the file system driver.

In any of the examples herein showing a file driver, a storage volume driver implementation can be used instead or in addition. A storage volume driver can proceed with reference to volume offsets. Data can be correlated to the file offsets for known volume layouts.

If an application is distributed as a package of loose files targeted for deployment to an existing volume, then a file system driver can be implemented for the caching system. When an application is distributed as a virtual disk image or volume image, a storage volume driver hosting such an image can implement caching.

Volume offsets can be translated to file offsets, and file offsets can be translated to volume offsets for a known volume layout. In this way, telemetry such as chunk access information for either layout can be utilized on both file driver and storage volume driver implementations.

Example 10—Example Pre-Installation Pre-Fetching

In any of the examples herein, pre-fetching can begin before the application is installed (e.g., before it is selected for installation). For example, when an application installation user interface displays a plurality of possible installations for installation, it can be determined that it is highly likely that a particular application will be installed. Responsive to such a determination, the recipe file for the particular application can be obtained and pre-fetching can begin based on the recipe file.

Example 11—Example Streaming Installation at Client

Figure 3:
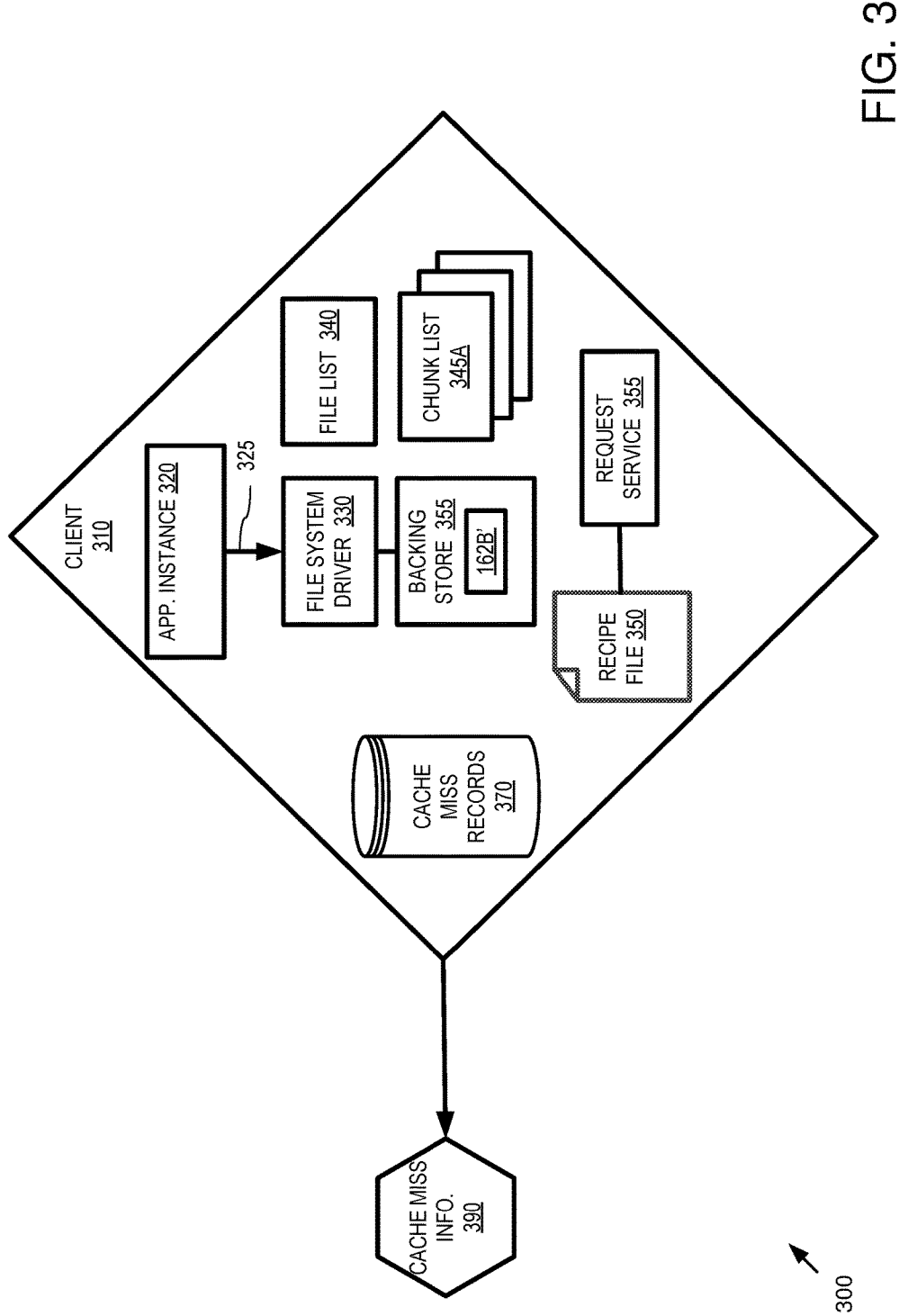
FIG. 3 is a block diagram of an example client system implementing evolving streaming installation of software applications.

FIG. 3 is a block diagram of an example client system 300 implementing evolving streaming installation of software applications and can be used on any of the client devices described herein to implement the technologies.

In the example, an instance 320 of an application is being installed at the client device 310. During execution (e.g., during ongoing streaming installation), the application 320 can send requests 325 to a file system driver 330, which accesses a backing store 355 that can serve as a sparse storage location on device media containing downloaded chunks (e.g., application file chunk 162B').

A file list 340 can list the files for the application and metadata for the files (e.g., to satisfy directory search operations and the like). The chunk lists 345A-N can store a list of downloaded (e.g., locally resident) data chunks for respective of the files in the file list 340.

A request service 355 can consult a recipe file 350 and work in conjunction with the file system driver 330 to retrieve application file chunks on demand and also pre-fetch application file chunks. When a cache miss occurs, a record 370 can be generated and eventually sent 390 to a cache miss telemetry server for aggregation as described herein. Such information can also include chunk access information other than cache misses, such as access patterns, near misses, unused chunks, and the like.

Example 12—Example Streaming Installation

Figure 4:
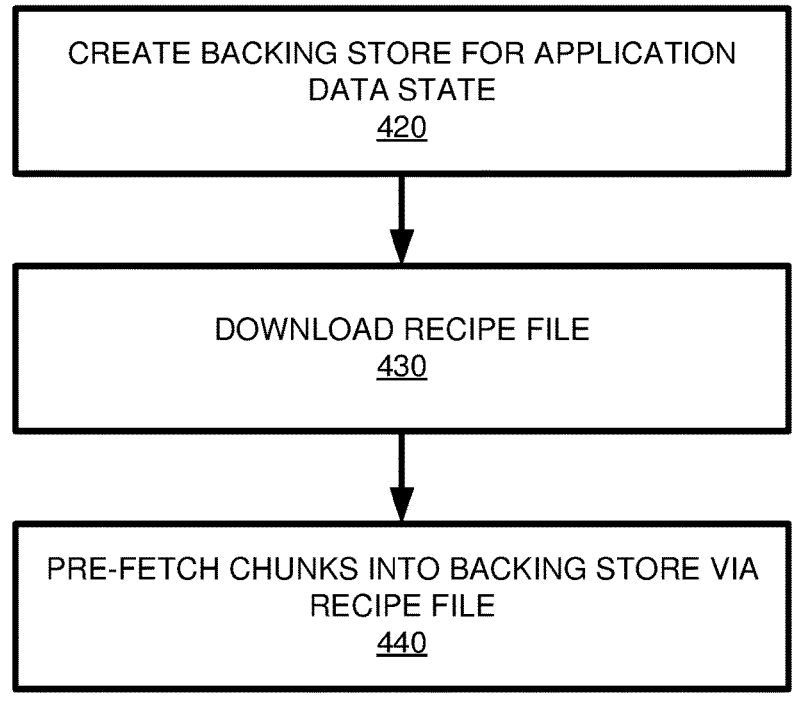
FIG. 4 is a flowchart of an example method of streaming installation of a software application.

FIG. 4 is a flowchart of an example method 400 of streaming installation of a software application and can be implemented, for example, by any of the client devices described herein (e.g., by a request service). Streaming installation can allow the application to execute before the entire application is locally resident on a client device.

At 420, a backing store for application data state is created. Backing store processing can also include downloading the application's file list, which is saved to the backing store. The chunk list is initially empty and is populated as chunks are downloaded.

At 430, the application's current recipe file is downloaded and saved to the backing store.

At 440, application file chunks are pre-fetched into the backing store via the recipe file. In this way, the technologies read ahead of what chunks are requested for use by the application.

The recipe file can include a tag indicating the minimum list of chunks needed to launch the application. After such chunks are downloaded, the system reports that the application has been successfully installed. The application can then execute. Meanwhile, additional chunks can be pre-fetched to avoid cache misses as application execution requests data found in additional chunks.

Example 13—Example Application File Access

Figure 5:
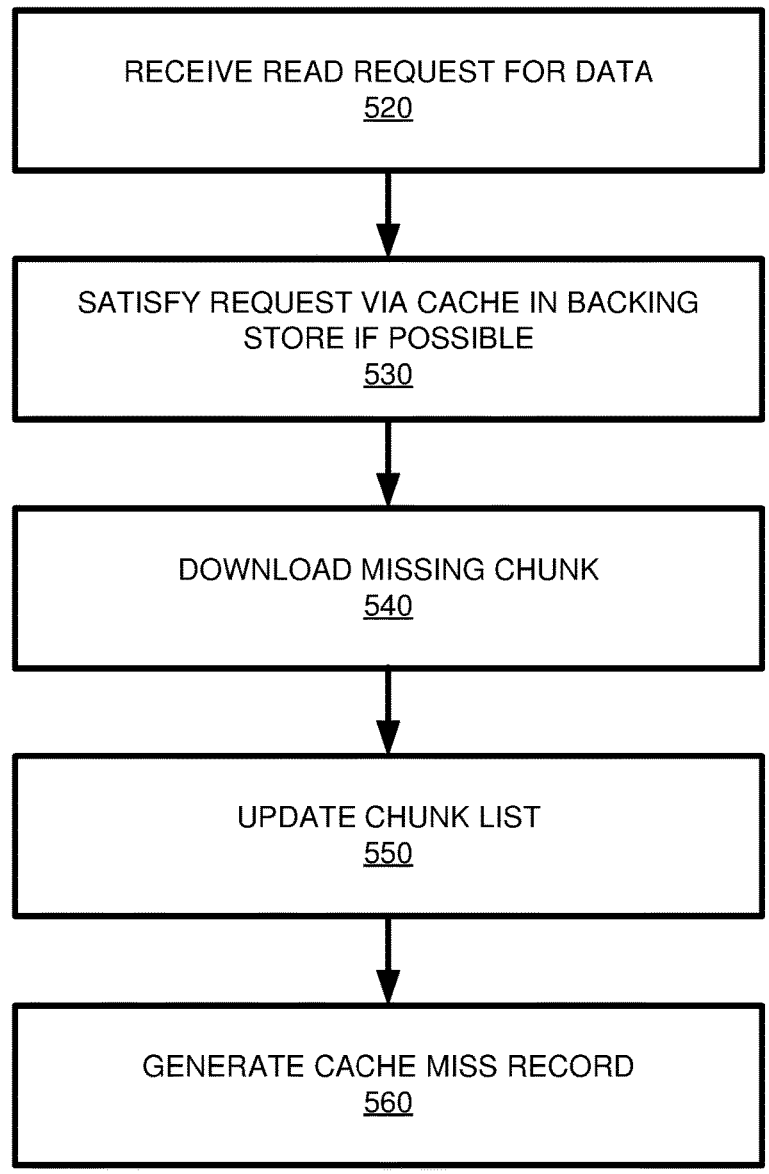
FIG. 5 is a flowchart of an example method of accessing application files in an application file chunking scenario.

FIG. 5 is a flowchart of an example method 500 of accessing application files and can be implemented, for example, by any of the clients described herein (e.g., by a request service). At 520, a file system driver receives a read request for data. A file chunk associated with the file read request can then be determined.

If possible, the request can be satisfied at 530 via the cache in the backing store (e.g., the application chunk containing the data is already present locally because it was pre-fetched or otherwise downloaded).

If an application chunk is missing, the driver can download the missing chunk 540 and update the chunk list 550.

As a result of detecting the missing chunk, a cache miss record can be generated at 560 and sent to the cache miss telemetry server. A plurality of cache miss records can be accumulated locally and periodically sent to the cache miss telemetry server (e.g., after downloading the missing chunk). As described herein, such a record can include context information to identify circumstances under which the cache miss occurred.

In practice, other chunk access information can be sent as well. For example, even if a cache miss does not occur, chunk access information can be recorded and sent to the cache miss telemetry server for processing and generating a revised recipe file for the application.

Example 14—Example Pre-Fetch Method

Figure 6:
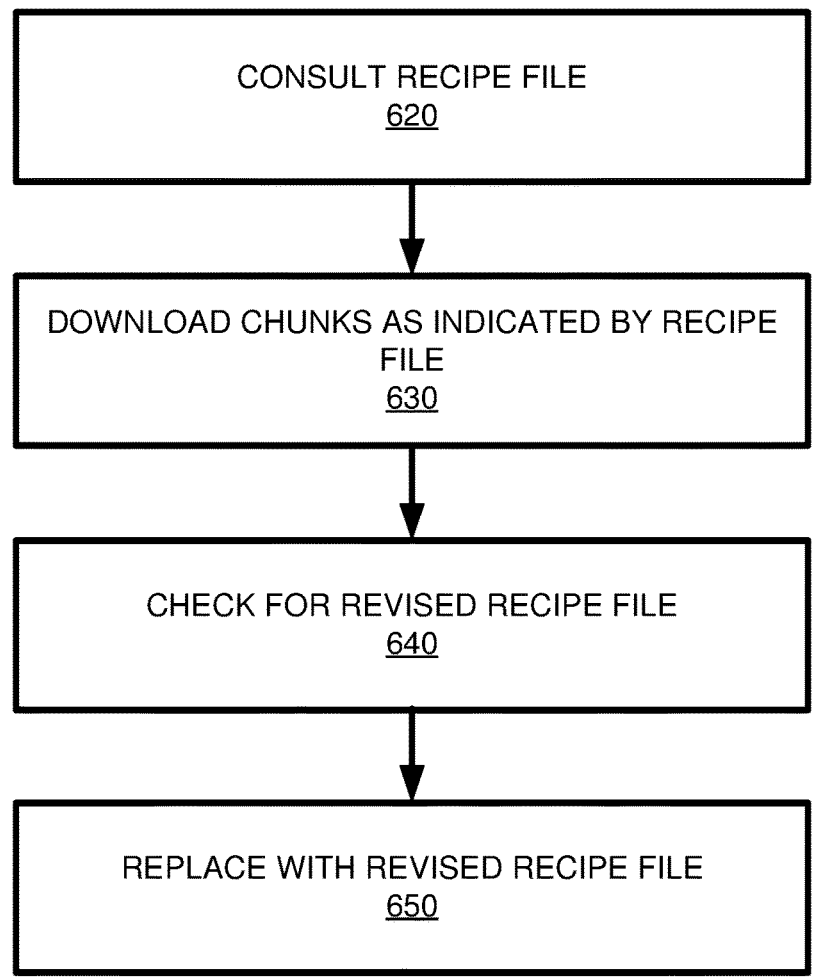
FIG. 6 is a flowchart of an example method of pre-fetching application file chunks.

FIG. 6 is a flowchart of an example method 600 of pre-fetching file chunks and can be implemented, for example, in any of the clients described herein (e.g., by a request service at a client device). At 620, the recipe file is consulted. For example, a chunk or chunk sequence can be indicated as next to be pre-fetched.

At 630, the chunks indicated by the recipe file are pre-fetched to the client backing store. Meanwhile, the application can execute and take advantage of any pre-fetched application file chunks.

At 640, a periodic check for a revised recipe file can be made.

At 650, responsive to determine that a revised recipe file is available, the current recipe file is replaced with the revised one.

Example 15—Example File Content Tag Identifiers

In any of the examples herein, file content tag identifiers can be used to delimit a portion of a file that can be referred to as a block. A start and stop tag can be used to surround content that can be referred to in a recipe file or by the application when communicating with a service providing streaming installation.

For example, content for "Level 2" can use tags such as "FILE_TAG_LEVEL2_START" and "FILE_TAG_LEVEL2_END" where operations occurring between the two tags can be associated with the execution of "Level 2" such that querying for the existence of "FILE_TAG_LEVEL2_END" directly notifies the application of the existence of prerequisite data needed to execute "Level 2." Such tags can thus function as application-defined triggers to ensure data is resident locally before execution of the part of the application associated with the identified functionality (e.g., "Level 2") should proceed.

The application can query the service to determine when content associated with a label is available locally without having to implement functionality for tracking which content has been fetched.

The tags can take the form of files (e.g., named according to a special naming convention containing a content label and using "START" and "END") that when read or written by the application provide additional information to the caching system about the sequence of operations to follow.

Such a mechanism can be used to communicate a delay or completion condition between a providing service and an application as described herein.

Example 16—Example Recipe File Branch

Figure 7:
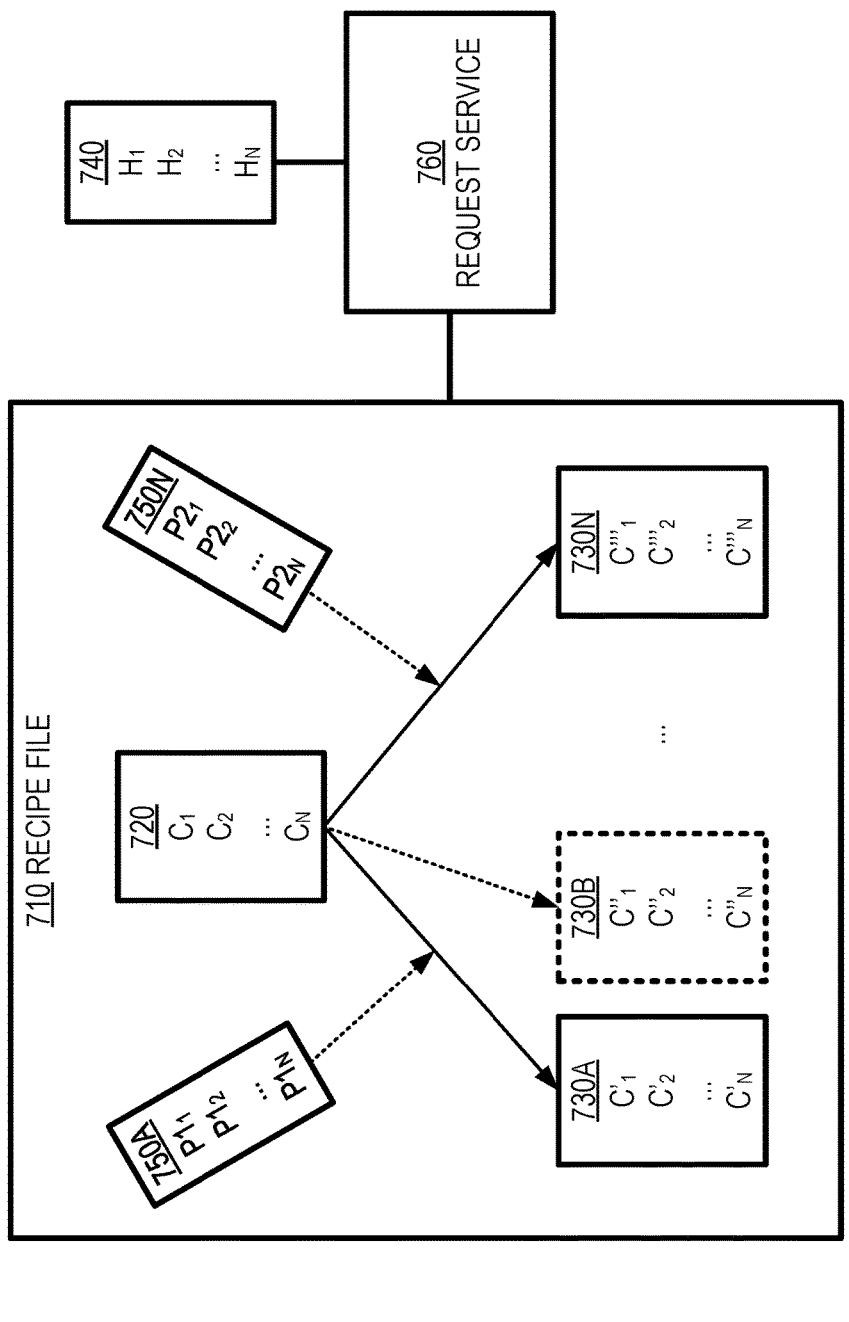
FIG. 7 is a block diagram showing a branch in a recipe file.

FIG. 7 is a block diagram showing a system 700 supporting alternate paths in a recipe file 710 and can be used in any of the examples herein. In the example, a request service 760 serves as an installation manager and manages application chunk requests and pre-fetching activity. Chunks can be internally represented by chunk identifiers.

In the example, a recipe file 710 includes a sequence 720 of chunks to be pre-fetched. A branch within the recipe file can direct pre-fetching to one of a plurality of possible alternative application file chunk paths 730A-N. Determining which alternative path to take can be achieved by comparing an alternative path template 750A-N with the actual chunks requested by the application, which are stored as a history 740. For example, a sliding window can be used to determine a match between a template 750A and the history 740. Although sequences are shown, a deprecated case of a path template can be a single chunk (e.g., when a certain precursor chunk is observed in the history, a particular path is indicated).

Upon detecting a match against a template 750A-N, prefetching branches to the respective path 730A-N associated with the template 750A-N. A percentage match threshold (e.g., between the history 740 and the template 750A-N) within a window of n chunks can be considered a match, resulting in activation of the respective path 730A-N.

As described herein, such branches can be added into a revised recipe file based on aggregated chunk access information.

In any of the branching examples herein, it may be determined that two or more branches remain after other branches are eliminated. In such inconclusive branching scenario, the technologies can pre-fetch chunks from a plurality of candidate branches (e.g., until a more conclusive determination can be made). In practice, a sequence of length/can be pre-fetched for the first branch, and then a sequence of the same or similar length can be pre-fetched for a second branch. In this way, parallel pre-fetching across branches in the recipe file can be performed.

Although the existence of multiple templates 750A-N is shown as a branch, in practice, unmatched templates can continue to be active for detection, even after selection of a branch path. Thus, a template can serve as a trigger that causes activation of the associated path upon detection of a match between the template and the history, even after selection of another path.

In a deprecated implementation, a single chunk identifier can serve as a trigger for activating a path. So, responsive to detecting the single chunk identifier in the history 740, a sequence 730A can be pre-fetched. If multiple paths 730A-N are indicated, parallel pre-fetching can be performed. Paths can be prioritized via a stored path priority, which can be categorized (e.g., high, medium, low, or the like) or relative to other paths.

Example 17—Example Revised Recipe File Generation System

Figure 8:
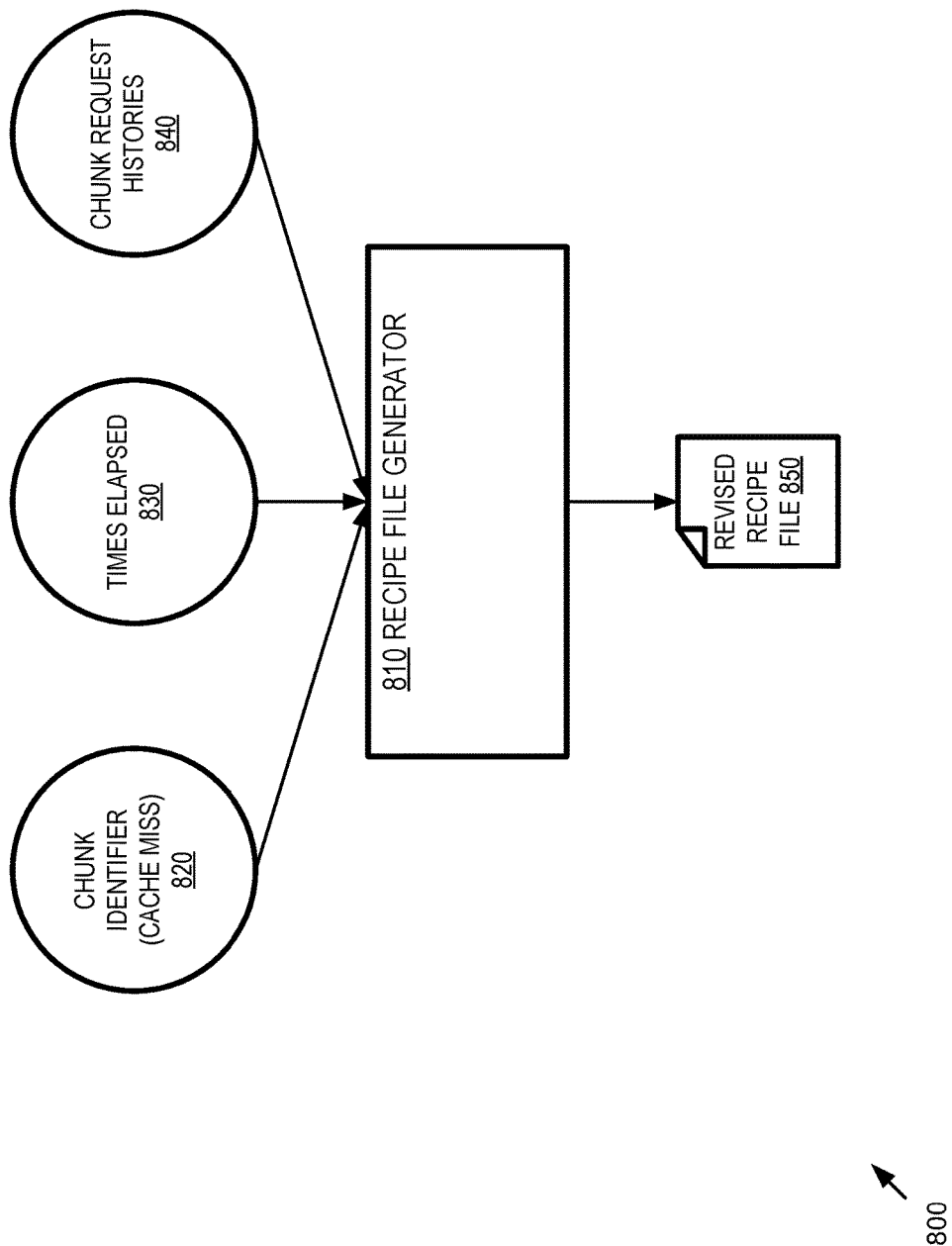
FIG. 8 is a block diagram of an example system implementing revised recipe file generation.

In any of the examples herein, a revised recipe file can be built on chunk access information aggregated from a plurality of clients that are executing an application. FIG. 8 is a block diagram of an example revised recipe file generation system 800 that can be implemented in any of the examples herein to evolve streaming installation.

In the example, a recipe file generator 810 receives a chunk identifier 820 (e.g., associated with a reported cache miss), times elapsed 830 (e.g., indicating the time elapsed at the time the cache miss for the identified chunk occurred), and chunk request histories 840 (e.g., associated with the reported cache miss for the identified chunk). The generator can aggregate the input information and generate a revised recipe file 850. The revised recipe file 850 is improved based on crowdsourced cache miss information. Thus, adoption of the recipe file 850 in future installations can avoid the cache miss.

In practice, the recipe file generator 810 can accept an old recipe file as input and incorporate the aggregated input information into the existing file, resulting in a revised recipe file 850. For example, a branch can be added, the chunk can be moved within the file, or the like. Or, the revised recipe file can be generated anew.

Processing can proceed by prioritizing a particular chunk (e.g., a most troublesome chunk that causes the most misses across clients, causes the greatest delay, or the like) and moving to lower priority chunks. However, a grouped chunk approach can also be implemented.

Example 18—Example Method of Generating a Revised Recipe File

Figure 9:
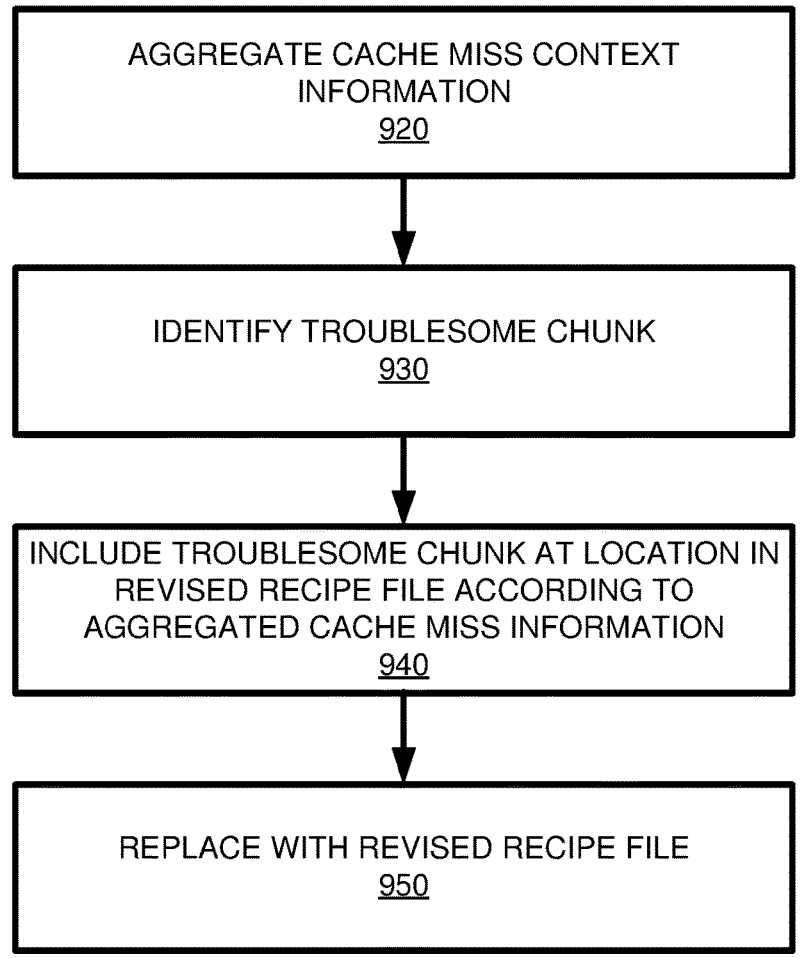
FIG. 9 is a flowchart of an example method of generating a revised recipe file.
Figure 9:

FIG. 9 is a flowchart of an example method 900 of generating a revised recipe file and can be implemented in any of the examples herein where aggregated chunk access information is collected (e.g., from a plurality of installing clients, executing clients, or the like), including the system of FIG. 8. In the example, a particular (e.g., troublesome) chunk is selected for analysis.

At 920, the context information for cache misses related to the chunk is aggregated.

At 930, a troublesome chunk is identified. For example, a chunk that consistently appears in cache misses across clients can be selected. Chunks can be prioritized by elapsed time (e.g., chunks having earlier cache misses are prioritized for processing first).

At 940, based on the aggregated cache miss context information for the troublesome chunk, the chunk is included in the revised recipe file at a location according to the aggregated context information for cache misses. Weights can be used to balance selection of one chunk over another chunk to take priority in sequences and whether a branch is to be created. The particular chunk selected for analysis can be included within the recipe file at a location appropriate based on the analysis.

At 950, the current recipe file is replaced with the revised recipe file.

Any number of other heuristics can be used. For example, probabilities can be calculated and chunks order based on probabilities that a particular chunk will be needed.

Example 19—Example Aggregation of Chunk Access Information

In any of the examples herein, aggregation of chunk access information (e.g., cache miss context) from a plurality of executing clients that are stream installing an application can be implemented and applied to determine information to be included in a revised recipe file. Although particular heuristics are described herein, any of a variety of alternatives can be applied against the aggregated chunk access information, including machine learning techniques.

A cache miss context can comprise an elapsed time parameter for a particular application chunk that caused a cache miss. Generating a revised recipe file can comprise altering the recipe file to request the particular application chunk before the elapsed time indicated by the parameter.

Elapsed time information for cache misses related to a particular chunk can be aggregated. Such aggregation can take the form of determining how many (e.g., percentage) of clients are experiencing a cache miss for a particular chunk within a proposed time window. As the proposed time window is expanded, the percentage of clients is expected to increase. If the percentage reaches a threshold, the particular chunk can be identified as a troublesome chunk. The elapsed times can then be evaluated to determine an appropriate location within the recipe file to place the troublesome chunk (e.g., at a location before the earliest elapsed time, or before a statistically significant portion of the elapsed times, such as n standard deviations). In practice, a sequence of chunks can be used instead of a single chunk.

The cache miss context can comprise an application chunk request history indicating actual chunks requested by the application before the particular application chunk that caused the cache miss. The history thus indicates application chunk requests by the executing instance of the application at the client reporting the cache miss context. Generating the revised recipe file can comprise altering the recipe file to request the particular application chunk responsive to determining that an application chunk in the request history is requested (e.g., by another executing instance of the application). For example, the template and path mechanisms described herein can be included in the revised recipe file to detect a chunk identifier.

In addition to or instead of time elapsed information, request history information can be aggregated for a particular troublesome chunk. Such aggregation can take the form of determining a common chunk or set of chunks in the request history. A common chunk that differentiates over chunks already repeatedly appearing can be chosen as a trigger chunk. The trigger chunk can then be used as a template to determine when the troublesome chunk should be pre-fetched. For example, the trigger chunk can be incorporated into a branch as described herein.

Example 20—Example Implementation

In any of the examples, a method can proceed as follows:
A plurality of cache miss records can be received from a plurality of client devices installing an executable application, wherein the cache miss records indicate a local chunk request history before a cache miss responsible for a cache miss record.

The plurality of cache miss records can be aggregated, wherein aggregating comprises identifying a troublesome application file chunk and a distinguishing common application file chunk in local chunk request histories associated with the troublesome application file chunk.

An alternative path template comprising a chunk identifier of the distinguishing common application file chunk can be generated.

An application file chunk path comprising a chunk identifier of the troublesome application file chunk can be generated.

The alternative path template and the application file chunk path can be incorporated into a revised recipe file, wherein the application file chunk path is activated for pre-fetching when a match is detected between the alternative path template and a local chunk request history.

The revised recipe file can then be published for implementation at a client device as described herein.

Example 21—Example Advantages

In any of the examples herein, a variety of advantages can result. For example, pre-fetching application file chunks can result in avoidance of cache misses. Therefore, application execution interruption (e.g., waiting for acquisition of the missing chunks) can be avoided.

Because the application can begin executing before the entire set of application chunks is acquired, the application can start executing sooner. As a result, overall performance is enhanced.

By abstracting streaming logic at the file system level, an application developer can write code as they normally would. The operating system can stream chunks preemptively following the recipe file generated from feedback of previous streaming executions. On demand streaming of chunks can satisfy requests for a missing chunk immediately.

Numerous other advantages can result. For example, any number of applications can take advantage of the technologies, even when developed without regard to the technologies described herein. Thus, streaming installation can be transparent to the application.

Example 22—Example Computing Systems

Figure 10:
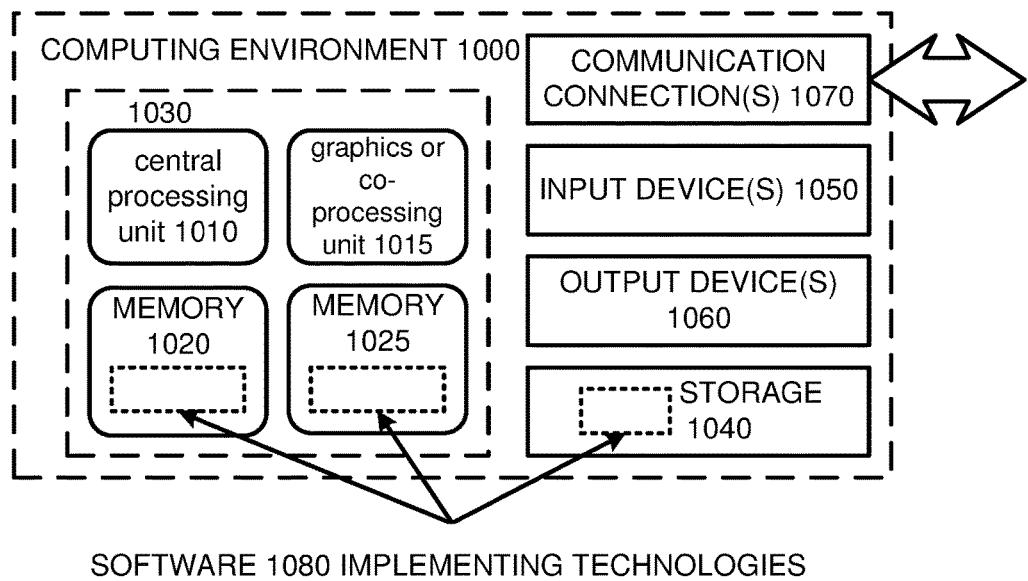
FIG. 10 is a diagram of an example computing system in which described embodiments can be implemented.

FIG. 10 illustrates a generalized example of a suitable computing system 1000 in which several of the described innovations may be implemented. The computing system 1000 is not intended to suggest any limitation as to scope of use or functionality, as the innovations may be implemented in diverse computing systems, including special-purpose computing systems. In practice, a computing system can comprise multiple networked instances of the illustrated computing system.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions. A processing unit can be a central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, solid state drives, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. For video encoding, the input device(s) 1050 may be a camera, video card, TV tuner card, or similar device that accepts video input in analog or digital form, or a CD-ROM or CD-RW that reads video samples into the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 23—Computer-Readable Media

Any of the computer-readable media herein can be non-transitory (e.g., volatile memory such as DRAM or SRAM, nonvolatile memory such as magnetic storage, optical storage, solid state drives, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. All that comes within the scope and spirit of the claims is therefore claimed.

What is claimed is:

1. A computer-implemented method comprising:
from a plurality of client devices installing an executable application available for installation and comprising a plurality of application chunks via a recipe file indicative of a nonlinear ordering of the application chunks, receiving application chunk access information, wherein the application chunk access information comprises indication of at least one application chunk requested during execution of the executable application but not resident at a reporting client device;
aggregating the application chunk access information, wherein aggregating the application chunk access information comprises identifying a particular application chunk as to be pre-fetched;
based on the application chunk access information from the plurality of client devices, generating a revised recipe file, wherein generating the revised recipe file comprises specifying that the particular application chunk is to be pre-fetched; and
publishing the revised recipe file for consumption by future client devices installing the executable application;
wherein:
the application chunk access information comprises a cache miss context; and
generating the revised recipe file comprises incorporating the cache miss context into the revised recipe file.

2. One or more computer-readable media comprising computer-executable instructions that when executed cause a computing system to perform the method of claim 1.

3. The method of claim 1 wherein:
generating the revised recipe file comprises incorporating a plurality of alternative path templates into the revised recipe file, wherein the alternative path templates are associated with respective alternative paths indicating application file chunks to be pre-fetched.

4. The method of claim 1 wherein:
the cache miss context comprises an elapsed time parameter for a particular application chunk; and
generating the revised recipe file comprises altering the recipe file to request the particular application chunk before an elapsed time indicated by the elapsed time parameter.

5. The method of claim 4 further comprising:
aggregating elapsed time parameters across a plurality of the client devices.

6. The method of claim 1 wherein:
the cache miss context comprises an application chunk request history before a particular application chunk, wherein the request history indicates application chunk requests by an executing instance of the application; and
generating the revised recipe file comprises altering the recipe file to request the particular application chunk responsive to determining that an application chunk in the request history is requested by another executing instance of the application.

7. The method of claim 6 further comprising:
aggregating chunk request histories across a plurality of client devices.

8. The method of claim 1 further comprising:
identifying a branch condition within the application chunk access information from the plurality of client devices; and
responsive to identifying the branch condition, adding a branch condition to the recipe file.

9. The method of claim 1 wherein:
at least one of the client devices comprises an operating system comprising a file service configured to receive a file read request from an executing instance of the executable application, determine a file chunk associated with the file read request, determine whether the file chunk is locally resident, and request the file chunk from a remote location when not locally resident.

10. The method of claim 9 wherein:
the file service is further configured to generate a cache miss record for the file chunk.

11. The method of claim 9 wherein:
the file service is configured to communicate a delay condition to the executable application.

12. The method of claim 9 wherein:
the operating system is configured to employ a delay accommodating operating system affordance in response to determining that the file chunk is not locally resident.

13. A computing system comprising:
one or more hardware processors;
a plurality of application file chunks of an executable application available for installation by a plurality of requesting client devices;
a recipe file comprising a nonlinear ordering of the application file chunks;

an application installation service configured to receive a request for an application file chunk from a requesting client device and responsive to the request, send the application file chunk to the requesting client device; and a cache miss telemetry server configured to receive a report that an application file chunk associated with a chunk identifier resulted in a cache miss and generate a revised recipe file based on the chunk identifier of the report;

wherein:

the report further indicates a context in which the cache miss occurred; and the context is integrated into the revised recipe file.

14. The computing system of claim 13 wherein:
the context comprises a time elapsed parameter.

15. The computing system of claim 13 wherein:
the revised recipe file comprises a plurality of alternative application file chunk paths.

16. The computing system of claim 13 wherein:
the context comprises an application file chunk request history.

17. The computing system of claim 13 wherein:
the revised recipe file comprises an application file path template comprising an application file chunk identifier of a precursor application file chunk identified as present in a plurality of chunk request histories before the cache miss resulted; and the revised recipe file comprises an alternative application file chunk path comprising an application file chunk identifier of an application file chunk causing the cache miss;

whereby the recipe file causes pre-fetching of the application file chunk causing the cache miss responsive to determining that the precursor application file chunk is requested by a client device employing the recipe file.

18. One or more computer-readable media comprising computer-executable instructions that when executed cause a computing system to perform a method comprising:

receiving a plurality of cache miss records from a plurality of client devices installing an executable application, wherein the cache miss records indicate a local chunk request history before a cache miss responsible for a cache miss record and further indicate a context in which the cache miss occurred;

aggregating the plurality of cache miss records, wherein aggregating comprises identifying a troublesome application file chunk and a distinguishing common application file chunk in local chunk request histories associated with the troublesome application file chunk;

generating an alternative path template comprising a chunk identifier of the distinguishing common application file chunk;

generating an application file chunk path comprising a chunk identifier of the troublesome application file chunk; and incorporating the alternative path template and the application file chunk path into a revised recipe file, wherein the application file chunk path is activated for pre-fetching when a match is detected between the alternative path template and a local chunk request history, and the context in which the cache miss occurred is integrated into the revised recipe file.

* * * * *